April 4, 1939.  W. B. HERNDON  2,153,085

TRANSMISSION INTERLOCK

Filed July 15, 1938

Inventor
Walter B. Herndon
By Blackmore, Spencer & Flint
Attorneys

Patented Apr. 4, 1939

2,153,085

UNITED STATES PATENT OFFICE 2,153,085

TRANSMISSION INTERLOCK

Walter B. Herndon, Detroit, Mich., assignor to General Motors Corporation, Detroit, Mich., a corporation of Delaware Application July 15, 1938, Serial No. 219,394

7 Claims. (Cl. 74—477)

This invention relates to change speed transmissions such as are used for motor vehicles and is particularly concerned with an improved detent and interlock for movable members which are used as parts of the mechanism by which changes in driving ratio are effected.

The object of the invention is to provide an improved detent and interlock whereby a selected mechanism is retained in position and whereby the unselected mechanism is restrained from movement from a neutral to an active position.

As further objects, the invention aims to accomplish its major object by a construction which shall be effective and comparatively simple and inexpensive.

Figure 1:
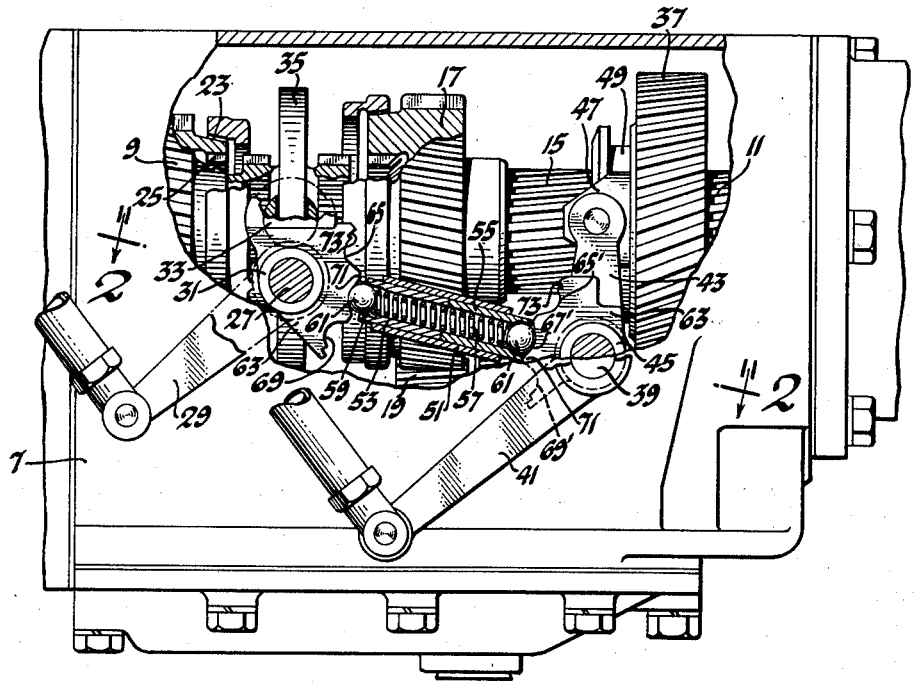
Figure 1 is a view in side elevation of a transmission housing, the wall being partly broken away, and showing parts in section.

On the drawing, numeral 7 represents a housing for the change speed mechanism of a motor vehicle. No invention is herein claimed for the gearing per se and it will be briefly referred to only. There is shown a gear 9 which is on the input shaft, the shaft driven by the engine through the conventional clutch. The output shaft marked 11 is splined with straight teeth not shown and with spiral teeth at 15. Between these teeth this output shaft carries rotatably mounted thereon a gear 17. Gear 17 is in constant mesh with a gear 19 on a countershaft, not shown, this countershaft being driven by the input shaft through the instrumentality of a train of gears of which gear 9 is the driving gear.

A clutch 35 is slidably mounted on the straight splines and is adapted to make clutch engagement with clutch teeth 25 of the input member 9 for driving in direct or high speed. Preferably, and as shown in the drawing some conventional synchronizing means will be used to effect synchronous rotation prior to engagement of the jaw teeth. This synchronizing mechanism is marked 23 on Figure 1. In a similar way clutch 35 may be moved to the right whereupon a similar synchronizing means and jaw tooth engagement may be employed to lock gear 17 to the output shaft 11 whereupon a drive in second speed is effected. For the purpose of reciprocating clutch 35 the gear housing journals a horizontally disposed rockshaft 27. Externally of the housing rockshaft 27 has a lever arm 29. Within the gear housing shaft 27 has a hub 31 from which extends vertically upward an arm 33, this arm carrying a shoe or like device to engage an annulus on the sliding clutch 35. It will then be understood that rotating of the rockshaft 27 reciprocates clutch 35 in opposite directions from a neutral position to effect high speed or second speed.

Gear 37 slides on splines 15 in one direction from its neutral position to engage a countershaft gear for driving in low speed. It may reciprocate in the opposite direction to engage a gear on a shaft mounted parallel with the countershaft and driven thereby. The latter position of gear 37 produces a drive in reverse. For the sliding of gear 37 there is used a second rockshaft 39, this rockshaft being also journaled in the side wall of the transmission and arranged in parallel relation to shaft 27. Rockshaft 39 has an external operating arm 41 and an inner lever arm 43 which latter extends upwardly from a hub 45 and carries a shoe 47 which engages with a collar 49 associated with gear 37.

It is intended that the rockshafts 27 and 39 shall be selectively rotated by some remote control means, preferably in the form of a lever mounted on the steeding column adjacent the steering wheel. The connections between such remote control means and the lever arms 29 and 41 may be of any form found convenient for the purpose.

Figure 2:
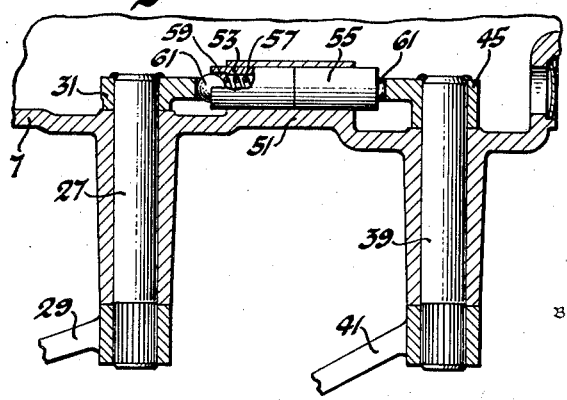
Figure 2 is a section on line 2—2 of Figure 1.

The invention sought to be protected by this application is more particularly related to the means for resiliently holding either rockshaft and the associated gear and clutch positioning parts in a selected position and for preventing the movement of either one of such mechanisms from its neutral position when the other is in an active position. To this end there is provided a tube formation 51 which may be as shown in Figure 2 a passage in the housing wall. The axis of this passage intersects the inner ends of the rockshafts 27 and 39. Within the passage there is reciprocably mounted a tubular element which may preferably, but not necessarily, be formed from two parts 53 and 55, and within this tubular element is a coil spring 57. The remote ends of parts 53 and 55 are recessed to form pockets as at 59 to receive balls 61. The pockets limit the inward movement of the balls whereby axial thrust against the ball may move the tubular member. The rockshaft hubs are provided with cams 63 and 63'. These cams have three recesses 65, 67, 69 and 65', 67' and 69'.

Figure 3:
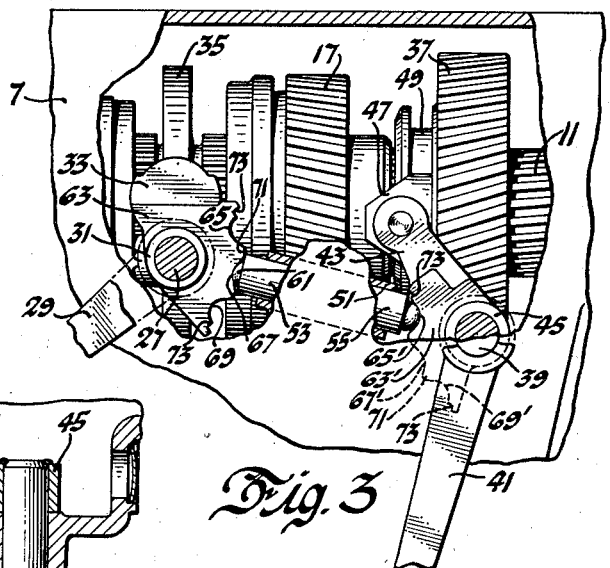
Figure 3 is a view corresponding to Figure 1 but with certain parts displaced from the position shown by Figure 1.

The spring 57 presses the balls away from each other and into one or another of the recesses in the cams. It will be seen from Figure 1 that the resilient resistance of spring 57 must be overcome to rock either rockshaft from any one of its three positions. To so change the position of the rockshaft the ball must be lifted over a ledge 71 such ledges being provided between the adjacent recesses. It will be observed that the remote ends of each cam have shoulders 73 which are of greater radial distance from the center of rotation than are the ledges 71. From Figure 1 it will be evident that in the inactive position of both shafts the tubular member 53—55 has its ends positioned adjacent the ledges 71 and that the distance between ledges is in excess of the combined length of the parts 53 and 55. This makes possible the rocking of one shaft from its neutral to its active position, the parts moving from the position shown by Figure 1 to that illustrated in Figure 3. In the position of Figure 3 the tubular element is between a ledge 71 on the unmoved cam of shaft 27 and a shoulder 73 on the cam of shaft 39 which has been rotated. Owing to the greater radial distance of shoulder 73 the linear distance between ledge 71 and shoulder 73 in the position of parts shown in Figure 3 corresponds substantially with the combined length of parts 53 and 55 so that the ends of the tubular element substantially engage both 71 and 73. In consequence the spring 57, acting upon the ball at the right end of the tubular member serves as a yielding means to hold one operative mechanism in its active position. At the same time the other mechanism, that related to rockshaft 27 is held from movement from its neutral position by the engagement of the tubular member 53 and 55 with the ledges 71 on either side of the neutral recess. The device may also operate if the tubular member does not actually contact at 71 as well as at 73. If the contact does not occur at 71 when the tubular member is reciprocated incidental to its contact at 73, the reciprocation is nevertheless sufficient to seat ball 61 in the bottom of the pocket 59 and thus prevent rotation of cam 63 with shaft 27.

The expedient above described is very simple and comparatively inexpensive and is effective in preventing the movement of one shift mechanism from neutral when the other is in active position.

I claim:

1. In a change speed transmission, spaced members adapted to be selectively moved to introduce driving ratios, each said member having a plurality of recesses with ledges therebetween and with shoulders at each end of each series of recesses, an interlock mounted for reciprocation between said members, the movement of said members being such that a line joining an intermediate recess of one of said members with any recess of the other may be made to coincide with the axis of said interlock, the length of the interlock being substantially less than a line parallel with said axis and extending between corresponding ledges but approximately equal to a similar line between a ledge and a shoulder.

2. The invention defined by claim 1, said interlock being tubular, balls in the ends of said tubular interlock and a spring between said balls.

3. The invention defined by claim 1, said interlock being tubular and having recesses at its ends, balls in said recesses adapted to seat therein and reciprocate said interlock in response to a movement of one of said members whereby the end of said interlock is moved away from the ledges of the member being moved.

4. The invention defined by claim 1, said transmission being positioned in a gear housing, said gear housing having a tubular journal for said interlock within a wall thereof.

5. The invention defined by claim 1, said interlock being composed of a plurality of axially disposed tubes.

6. The invention defined by claim 1, said members being parallel rockshafts, said rockshafts provided with cams, and said recesses, ledges and shoulders being formed on said cams.

7. In a change speed transmission, spaced members adapted to be selectively moved to introduce driving ratios, each said member having a plurality of recesses with ledges therebetween and with shoulders at each end of each series of recesses, an interlock mounted for reciprocation between said members, the movement of said members being such that a line joining an intermediate recess of one of said members with any recess of the other may be made to coincide with the axis of said interlock, the interlock being tubular and having shouldered pockets within its ends, balls in said pockets to engage the recess of said member, the length of the interlock being such that when one end contacts the adjacent shoulder of a first member the ball at the other end of the interlock is forced to the bottom of its pocket and because of its engagement within the pocket and recess, movement of the second member is prevented.

WALTER B. HERNDON.